United States Patent [19]

Minahara et al.

[11] Patent Number: 5,334,261

[45] Date of Patent: Aug. 2, 1994

[54] SOLDERING FLUX COMPOSITION AND SOLDER PASTE COMPOSITION

[75] Inventors: Hatsuhiro Minahara, Takatsuki; Noriko Ikuta, Kobe, both of Japan

[73] Assignee: MEC Co., Ltd., Hyogo, Japan

[21] Appl. No.: 1,409

[22] Filed: Jan. 7, 1993

Related U.S. Application Data

[63] Continuation of Ser. No. 877,819, May 4, 1992, abandoned.

[30] Foreign Application Priority Data

May 27, 1991 [JP] Japan ................................. 3-149193

[51] Int. Cl.$^5$ .................................................. B23K 35/34
[52] U.S. Cl. .................................. 148/23; 148/24; 148/25
[58] Field of Search ...................................... 148/23–25

[56] References Cited

U.S. PATENT DOCUMENTS

| | | | |
|---|---|---|---|
| 2,169,659 | 8/1939 | Noble | 148/24 |
| 2,829,998 | 4/1958 | Sutton | 148/23 |
| 4,092,182 | 5/1978 | Arbib | 148/23 |
| 4,180,419 | 12/1979 | Thompson | 148/23 |
| 4,243,440 | 1/1981 | Arbib | 148/23 |
| 4,601,763 | 7/1986 | Stratil et al. | 148/23 |

FOREIGN PATENT DOCUMENTS

| | | |
|---|---|---|
| 0288828A1 | 11/1988 | European Pat. Off. . |
| 0379290A1 | 7/1990 | European Pat. Off. . |
| 491008 | 8/1938 | United Kingdom . |
| 532267 | 1/1941 | United Kingdom . |
| 534084 | 2/1941 | United Kingdom . |
| 748241 | 4/1956 | United Kingdom . |
| 1458351 | 12/1976 | United Kingdom . |
| 1550648 | 8/1979 | United Kingdom . |

*Primary Examiner*—Peter D. Rosenberg
*Attorney, Agent, or Firm*—Oliff & Berridge

[57] ABSTRACT

Soldering flux and solder paste compositions which are non-acidic, low-residue, and non-corrosive, leaving no substantial residue after soldering without a subsequent cleaning process and yet exhibiting excellent solderability are disclosed. The compositions comprise (A) at least one compound which generates a peroxide by decomposition or oxidation when subjected to heating, and (B) at least one ester from an inorganic or organic acid which generates an acid by decomposition in the presence of compound (A). They are particularly advantageous for eliminating the cleaning process with a solvent such as Flon to solve the ozone layer destruction problem and for improving the performance of the in-circuit test for printed-circuit boards after soldering.

7 Claims, 1 Drawing Sheet

PASS (good soldering)

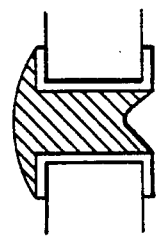
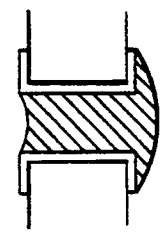
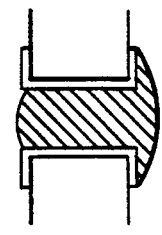
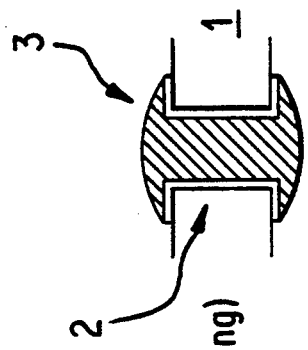
FIG. 1D  FIG. 1C  FIG. 1B  FIG. 1A
PASS (good soldering)
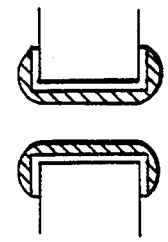
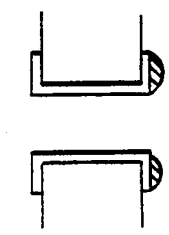
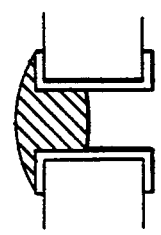
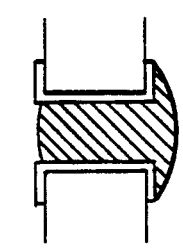
FIG. 2D  FIG. 2C  FIG. 2B  FIG. 2A
FAILURE (poor soldering)

SOLDERING FLUX COMPOSITION AND SOLDER PASTE COMPOSITION

This is a continuation of application Ser. No. 07/877,819 filed May 4, 1992, now abandoned.

BACKGROUND OF THE INVENTION

1. Field of the Invention

The present invention relates to a composition of a non-acidic, low-residue, non-cleaning soldering flux or solder paste which is inactive at ordinary temperatures, leaves substantially no residue after soldering, and requires no subsequent cleaning process.

2. Description of the Background Art

Soldering fluxes and solder paste fluxes of high-solid content containing a natural resin, such as rosin and the like, or a synthetic resin in conjunction with several kinds of active components, such as hydrohalogenated salts of amine or organic acids, are well known in the art. These components are expected to be activated when they are subjected to heating at a soldering temperature, however, some components contained in these conventional fluxes or solder pastes tend to be activated even when they are not being heated. When these fluxes are used, they sometimes invite corrosion of soldering equipment or printed-circuit boards to be soldered. In the case of solder pastes, these components even react with solder powder with which they are mixed, and lose their activity before use. In order to suppress the activation of the components during unheated stages and to preserve the maximum solderability at the soldering stage, a large amount of natural resins such as rosin and the like or synthetic resins are usually incorporated in these compositions. The addition of resins, however, brings about a serious problem to the compositions; leaving a great amount of residue on printed-circuit boards after soldering.

The massive residue on the surface of printed-circuit boards tends to hamper the contact of checker-pin in in-circuit tests after mounting. Because of this, the boards must be cleaned before testing with a solvent such as Flon (chlorofluorocarbon) or the like. However, the use of Flon will be totally banned in the near future pursuant to the Montreal Protocol.

In view of this situation, a number of low-residue type or non-cleaning type soldering fluxes and solder pastes are being developed. Many of them, however, try to achieve the object merely by lowering the content of resin components. If used without a cleaning process after mounting, they produce corrosion even higher than conventional high-solid, soldering fluxes. Some of them try to reduce corrosiveness by merely lowering the content of active components resulting in a solderability reduction. In the case of solder pastes, those containing a decreased amount of active components do not necessarily exhibit sufficient detergency on metal surfaces in an oxidative atmosphere and thus no longer applicable to a reflow process in the air. In other words, it requires a reflow process in an inert atmosphere using nitrogen gas or the like, thereby inflating the cost of production. In today's mounting process, sufficient solderability would not be guaranteed by a soldering flux of a weak activity, because flow soldering is applied to a copper surface or a solder-coated surface which has been oxidized and deteriorated by the reflow soldering.

The present inventors have already disclosed a low-residual type soldering flux (U.S. patent application Ser. No. 07/719,504) which comprises one or more acid components and one or more ester components. The composition is satisfactory from the aspects of solderability and leaving no residue after soldering, however, its storage stability is still to be improved, since it contains an acid as an essential component.

The subject to be solved by the present invention is, therefore, to develop an active component which exhibits no activity while unheated yet provides satisfactory solderability when use even at a low content, thereby preventing the occurrence of massive residues after mounting.

The present inventors have found that a combination of (A) a compound which is completely inactive at ordinary temperatures but generates a peroxide by decomposition or oxidation when subjected to heating, such as ethers, esters, unsaturated alcohols, and the like, and (B) a compound such as phosphoric esters, phosphorous esters, hypophosphite esters, boric esters, gallic esters, salicylic esters, and the like, which decomposes itself faster than evaporates at around soldering temperatures and generates an acid in the presence of component (A), provides an excellent soldering performance without corrosiveness.

SUMMARY OF THE INVENTION

Accordingly, an object of the present invention is to provide a soldering flux which comprises (A) at least one compound which generates a peroxide by decomposition or oxidation when subjected to heating and (B) at least one ester from an inorganic or organic acid which generates an acid by decomposition in the presence of compound (A).

In a preferred embodiment, said compound (A) is selected from the group consisting of ethers, esters, unsaturated alcohols; and said ester from an inorganic or organic acid (B) is selected from the group consisting of phosphoric esters, phosphorous esters, hypophosphite esters, boric esters, gallic esters, and salicylic esters.

Another object of the present invention is to provide a solder paste composition which comprises the flux of above-described components and a solder powder.

Other objects, features, and advantages of this invention will appear more fully from the following description.

BRIEF DESCRIPTION OF THE DRAWING

FIGS. 1A–1D and 2A–2D show the evaluation standard for the solderability of fluxes, in which the configurations of FIGS. 1A–1D illustrate the good soldered ones and the configurations of FIGS. 2A–2D illustrate the poor soldered ones.

DETAILED DESCRIPTION OF THE INVENTION AND PREFERRED EMBODIMENTS

In the composition of the present invention, an extremely low-residue soldering flux can be prepared by selecting an ester which produces an acid and an alcohol both evaporating at around soldering temperatures.

The storage life of the flux and solder paste of the present invention can remarkably be prolonged owing to the fact that the composition is entirely inactive at ordinary temperatures.

Given as examples of ethers which can easily generate peroxides are ethylene glycol monomethyl ether, ethylene glycol monoethyl ether, ethylene glycol monoisopropyl ether, ethylene glycol monoallyl ether, and the like; as esters which can easily generate peroxides are dimethyl phthalate, dimethyl maleate, octyl acetate, dibutyl maleate, dibutyl phthalate, ethylhexyl acetate, cyclohexyl acetate, isoamyl propionate, ethyl acetoacetate, and the like; and as unsaturated alcohols which can easily generate peroxides are allyl alcohol, 2-methyl-3-butene-2-ol, 2-methyl-3-butene-l-ol, 2-propyn-l-ol, 2-butyn-l-ol, 2-pentyn-l-ol, geraniol, linalool, nerol, and the like. One kind or two or more kinds of these compounds may be incorporated in the composition of the present invention in an amount of 0.1–20% by weight, preferably 1–5% by weight.

The ester which is decomposed by a peroxide and generates an acid effective for soldering includes phosphoric esters, phosphorous esters, hypophosphite esters, boric esters, gallic esters, salicylic esters, and the like. They may be used either singly or in combination and incorporated in the composition of the present invention in an amount of 0.1–20% by weight, and preferably 1–5% by weight.

As a solvent, isopropanol is chiefly used for soldering fluxes and butylcarbitol is used for solder paste fluxes, however. In addition, an appropriate amount of other common solvents such as methanol, ethanol, acetone, toluene, and the like can optionally be used together as required. Furthermore, other components such as, for example, antioxidants, plasticizers, thixo-modifiers, other activators, such as halogenated compounds, e.g., hydrohalogenated salts of amine, hydrohalogenated salts of quarternary ammonium salts, etc., organic acids, and the like, can optionally be added.

The solder paste composition of the present invention can be prepared by blending the soldering flux composition prepared according to the above-described manner and a solder powder. A preferable ratio by weight of the soldering flux and a solder powder is 12:88 to 8:92, and especially preferably 10.5:90.5 to 9.5:90.5.

When above-described conditions are fully satisfied, the composition assures satisfactory solderability with no problems of corrosion or decrease in electrical resistance. Most of the components will be decomposed, dissipated, evaporated or scattered by heat and wave while soldering, leaving substantially no residue on the surface of printed-circuit boards after soldering. These effects bring an advantage of eliminating a cleaning process after mounting of soldered boards with a solvent such as Flon or the like. This contributes not only to a cost reduction but also to avoidance of the ozone layer destruction by Flon. Another advantage is found in the in-circuit test of printed-circuit boards, which is employed as a major test method for detecting failures after soldering. Printed-circuit boards soldered by the soldering flux of the present invention hardly block the contact of checker-pin of the tester due to the absence of residues on their surface, thus remarkably increasing the productivity of printed-circuit boards.

Methods of soldering to which the soldering fluxes or solder pastes of the present invention are applicable are not limited to those in the air.

Other features of the invention will become apparent in the course of the following description of the exemplary embodiments which are given for illustration of the invention and are not intended to be limiting thereof.

EXAMPLES

Example 1–2 and Comparative Examples 1–2

Compositions of Examples 1–2 and Comparative Examples 1–2 shown in Table 1 were prepared and evaluated according to the following test method using test boards specified below. The results are presented in Table 1.

Test Method

The solderability on the through-holes of the test boards (1.6 mm thick, 76.0×76.0 mm) were evaluated by soldering with a flow-soldering machine.

Test Boards 0.8 nun through-hole, 600 holes/piece
N=10 (6,000 holes)

A test board was prepared by forming copper through-holes (25×24, total 600 holes) on a glass-epoxy substrate (G-10, 1.6 mm thick) and printing a thermoserring solder resist on the surface excluding the copper through-holes and through-hole lands.

Board pretreatment conditions

Each board was washed with acetone to remove fatty stains from the board surface, followed by etching with a mixed solution of sulfuric acid and aqueous hydrogen peroxide to eliminate copper oxides from the surface. Then, the board was heated for 90 minutes in a controlled atmosphere furnace at a temperature of 150° C. to give a uniform copper oxide layer on the surface.

Evaluation standard for the solderability on the throughholes

The Figures illustrate typical configurations obtained by the flow-soldering, showing standards for pass and failure. Each hole on the test board (600/piece) was tested to determine whether it passed the standard and the total percentage of passed holes (ratio of passes holes/total holes) was taken as the evaluation score of each flux composition. In the Figures, the configurations of FIGS. 1A–1D show the examples of good soldered ones and those in FIGS. 2A–2D show failed ones, in which 1 designates a substrate and 2 is a throughhole to be filled with solder 3.

Conditions of soldering equipment

A single-wave flow soldering-machine was used under the following conditions.

| | |
|---|---|
| 1. Preheating | 130° C. × 60 sec. |
| 2. Conveyer speed | 1 m/min. |
| 3. Soldering temperature | 235° C. |

The formulations of the soldering flux of the present invention (Examples 1–2) and those of conventional type (Comparative Examples 1–2) were given in Table 1, together with their test results.

Comparative Examples 1 and 2 exhibited comparatively good solderability of 67% or 94%, even though the test boards were heavily deteriorated by oxidation. However, since soldering fluxes used were of conventional rosin-type, a great amount of residue remained on the surface. This residue, without pre-cleaning, hampered the direct contact of the checker-pin of the in-circuit tester. The residual ion concentration of Comparative Examples 1 and 2 revealed to be as large as 90 and 115 μg NaCl /sq. inch, respectively.

In contrast, Examples 1 and 2 exhibited a remarkable improvement over the conventional fluxes of rosin type in the solderability; i.e., solderability of 100%. The residual ion concentrations of Examples 1 and 2 were as low as 12 and 10 μg NaCl sq. inch and well satisfied the required level of less than 14 μg NaCl sq. inch specified by the MIL standard.

cording to the present invention (Examples 3–4) and conventional solders (Comparative Examples 3–4) were given in Table 2, together with their test results. Each solder paste was prepared by mixing one (1) part of vehicle with nine (9) parts of solder powders.

Comparative Examples 3 and 4 exhibited relatively good spreadability as 88% or 92%, even though the test boards were heavily deteriorated by oxidation. However, since the solder paste comprised rosins, a great

TABLE 1

| Formulation (parts by weight) | | Solderability onto through-hole | Residual ion concentration (μg NaCl/sq. in.) | Appearance |
|---|---|---|---|---|
| Comparative Example 1 | | | | |
| WW rosin | 13 | 67% | 90 | A large amount of brownish rosin residue was remained |
| Diethylamine-HCl | 1 | | | |
| Stearic acid | 1 | | | |
| Isopropyl alcohol | Balance | | | |
| Comparative Example 2 | | | | |
| Hydrogenated rosin | 13 | 94% | 115 | A large amount of pale coloredrosin was remained |
| Cyclohexylamine-HCl | 1 | | | |
| Tetra-n-propylammonium bromide | 0.5 | | | |
| 2,3-Dibromo-1-propanol | 0.5 | | | |
| Isopropyl alcohol | Balance | | | |
| Example 1 | | | | |
| 2-Propyn-1-ol | 5 | 100% | 12 | No visible residue |
| Tributyl phosphate | 2 | | | |
| Oxalic acid | 1 | | | |
| Formic acid | 2 | | | |
| Isopropyl alcohol | Balance | | | |
| Example 2 | | | | |
| Allyl alcohol | 3 | 100% | 10 | No visible residue |
| Dibutyl phosphine | 2 | | | |
| Malonic acid | 1 | | | |
| Palmitic acid | 0.5 | | | |
| Isopropyl alcohol | Balance | | | |

Examples 3–4 and Comparative Examples 3–4

The effects of the solder paste of the present invention were demonstrated by solder paste compositions according to the present invention and comparative conventional compositions.

Test Method

Soldering spreadability was evaluated according to JIS Z-3197 6.10.

The formulations of solder paste compositions acamount of residue was remained on the surface, so that they entirely failed to comply with the in-circuit test for the defective soldering without cleaning. The residual ion concentration of Comparative Examples 3 and 4 revealed to be as high as 98 and 121 μg NaCl sq. inch, respectively.

In contrast, Examples 3 and 4 exhibited a remarkable improvement over those of conventional rosin type in spreadability. The residual ion concentrations of Examples 3 and 4 were as low as 24 and 32 μg NaCl sq. inch respectively; far less than the conventional type.

TABLE 2

| Formulation of vehicle (parts by weight) | | Soldering spreadability | Residual ion concentration (μg NaCl/sq. in.) | Appearance |
|---|---|---|---|---|
| Comparative Example 3 | | | | |
| Polymerized rosin | 60 | 88% | 98 | A large amount of brownish rosin residue was remained |
| Diethylamine hydrobromide | 1 | | | |
| Hydrogenated castor oil | 5 | | | |
| Butyl carbitol *1 | Balance | | | |
| Comparative Example 4 | | | | |
| Hydrogenated rosin | 50 | 92% | 121 | A large amount of pale colored rosin was remained |
| Cyclohexylamine-HCl | 1 | | | |
| Tetra-n-propylammonium bromide | 0.5 | | | |
| 2,3-Dibromo-1-propanol | 0.5 | | | |
| Hydrogenated castor oil | 5 | | | |
| Butyl carbitol *1 | Balance | | | |
| Example 3 | | | | |
| Polymerized rosin | 30 | 98% | 24 | Little residue was observed |
| 2-Propyn-1-ol | 5 | | | |
| Tributyl phosphate | 2 | | | |
| Hydrogenated castor oil | 5 | | | |
| Butyl carbitol *1 | Balance | | | |
| Example 2 | | | | |
| Polymerized rosin | 30 | 97% | 32 | Little residue was observed |

TABLE 2-continued

| Formulation of vehicle (parts by weight) | | Soldering spreadability | Residual ion concentration (μg NaCl/sq. in.) | Appearance |
|---|---|---|---|---|
| Allyl alcohol | 3 | | | |
| Dibutyl phosphine | 2 | | | |
| Hydrogenated castor oil | 5 | | | |
| Butyl carbitol *1 | Balance | | | |

Each solder paste was prepared by mixing one (1) part of vehicle with nine (9) parts of solder powders.
*1 Diethylene glycol monobutyl ether The flux of the present invention can significantly improve solderability and, in addition, causes no problem in the in-circuit test of printed-circuit boards for detecting defective soldering without cleaning after soldering, since it leaves substantially no residue after the soldering. Owing to these advantages, the flux of this invention can greatly contribute to the Flon regulation and to improvement of productivity.

Obviously, numerous modifications and variations of the present invention are possible in light of the above teachings. It is therefore to be understood that within the scope of the appended claims, the invention may be practiced otherwise than as specifically described herein.

What is claimed:

1. A soldering flux which comprises (A) at least one unsaturated alcohol which generates a peroxide by decomposition or oxidation when subjected to heating, and (B) at least one ester of an inorganic or organic acid which generates an acid by decomposition in the presence of unsaturated alcohol (A).

2. The soldering flux according to claim 1, wherein said (B) is selected from the group consisting of phosphoric esters, phosphorous esters, hypophosphite esters, boric esters, gallic esters, and salicylic esters.

3. The soldering flux according to claim 1, wherein the content of said compound (A) is in the range of from 0.1 to 20% by weight; and the content of said ester (B) is in the range of from 0.1 to 20% by weight.

4. A solder paste composition comprising the soldering flux according to claim 1 and a solder powder.

5. The solder paste composition according to claim 4, wherein the ratio by weight of said soldering flux and said solder powder is 12:88 to 8:92.

6. The soldering flux according to claim 1, wherein said unsaturated alcohol is selected from the group consisting of allyl alcohol, 2-methyl-3-butene-2-ol, 2-methyl-3-butene-1-ol, 2-propyn-1-ol, 2-butyn-1-ol, 2-pentyn-1-ol, geraniol, linalool, and nerol.

7. The soldering flux according to claim 1, wherein the content of said compound (A) is in the range of from 1-5% by weight.

* * * * *